Figure 3:
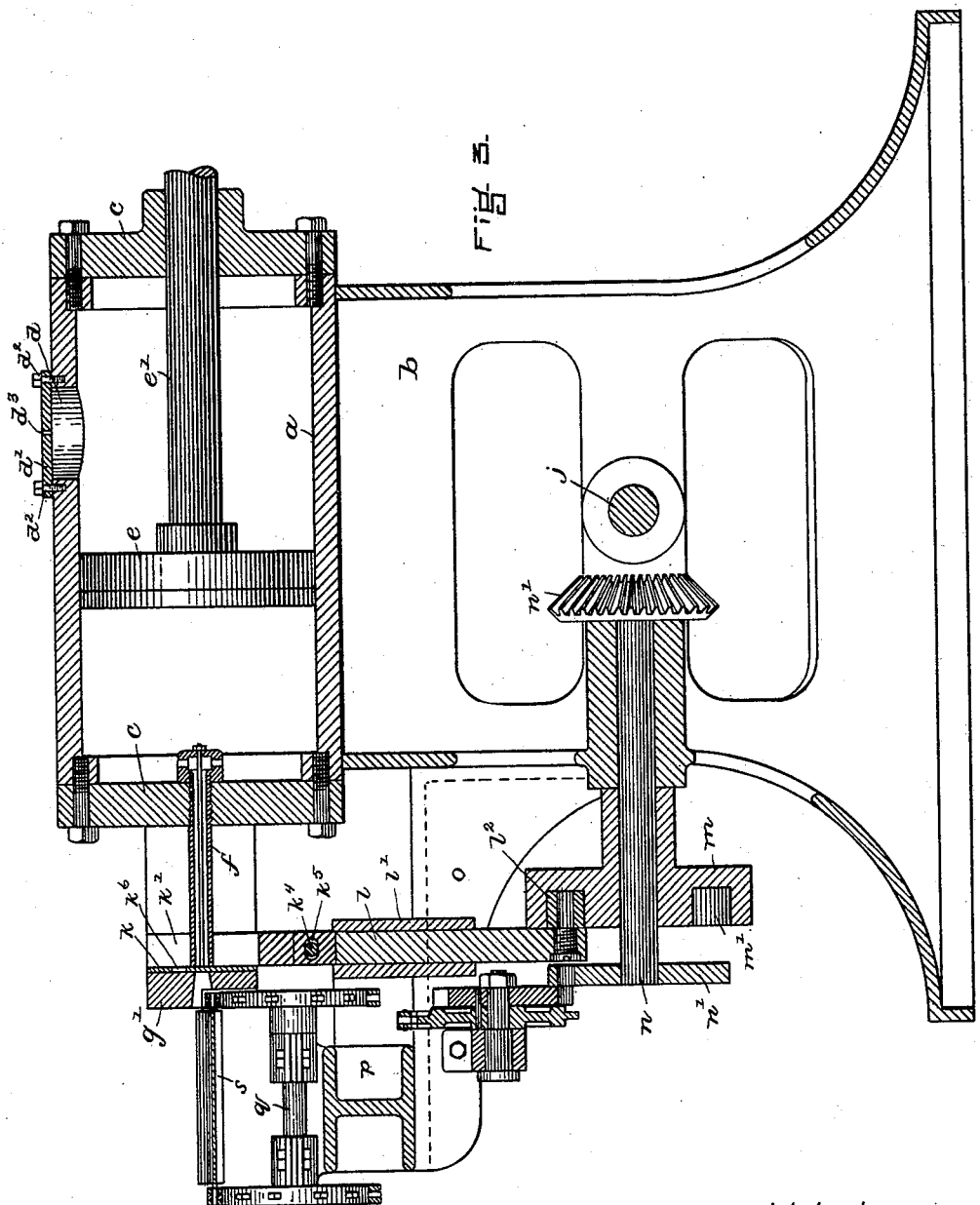

(No Model.) 5 Sheets—Sheet 1.
T. B. DOOLEY.
MACHINE FOR MAKING CARBONS.
No. 583,395. Patented May 25, 1897.
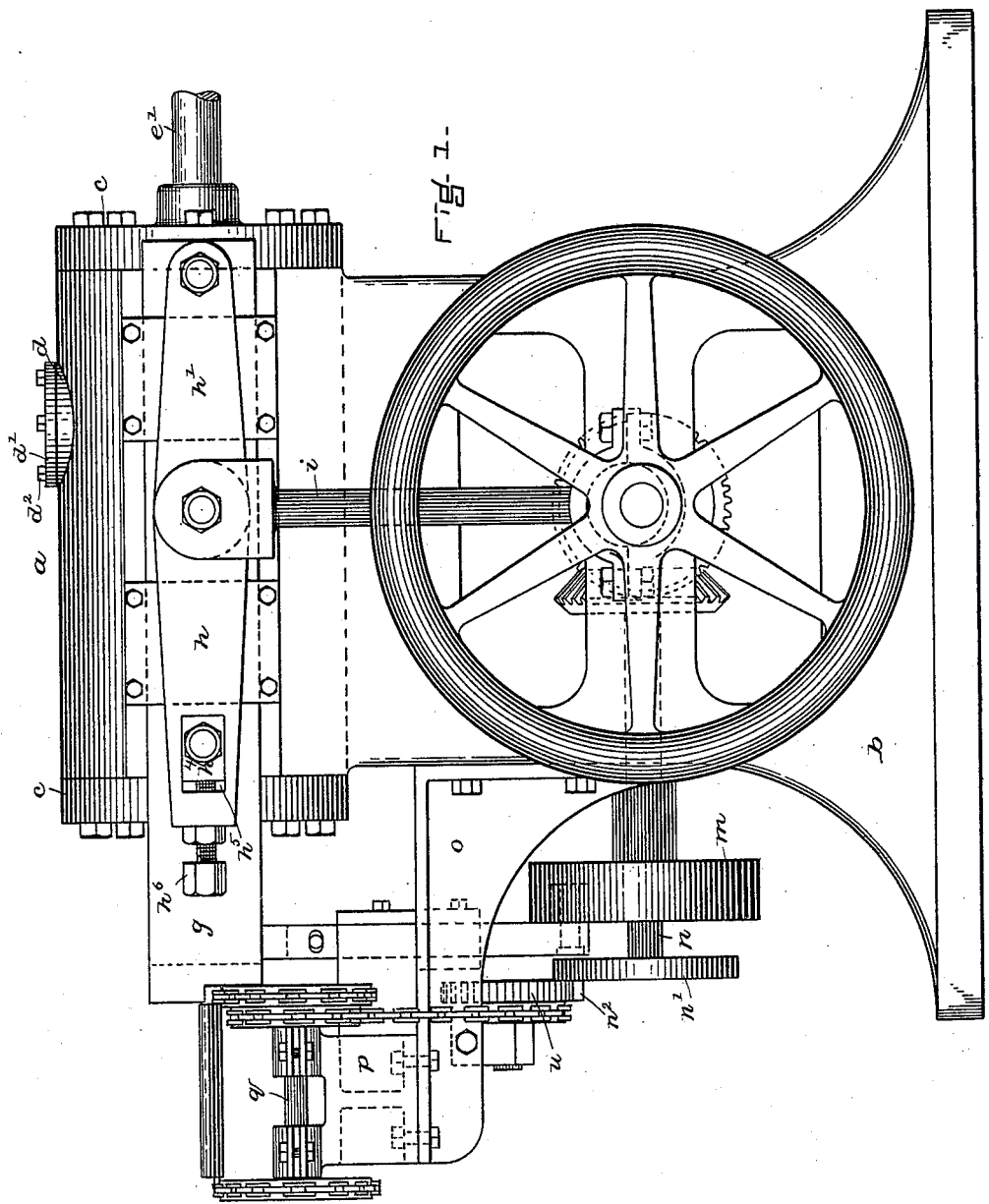
WITNESSES.
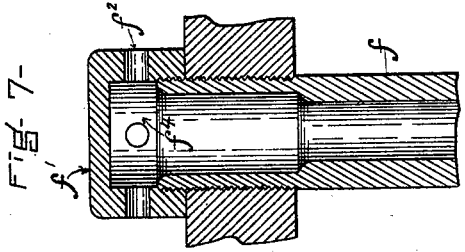
INVENTOR-
T. B. Dooley
By
A. W. Crossley
Atty (No Model.) 5 Sheets—Sheet 2.
T. B. DOOLEY.
MACHINE FOR MAKING CARBONS.
No. 583,395. Patented May 25, 1897.
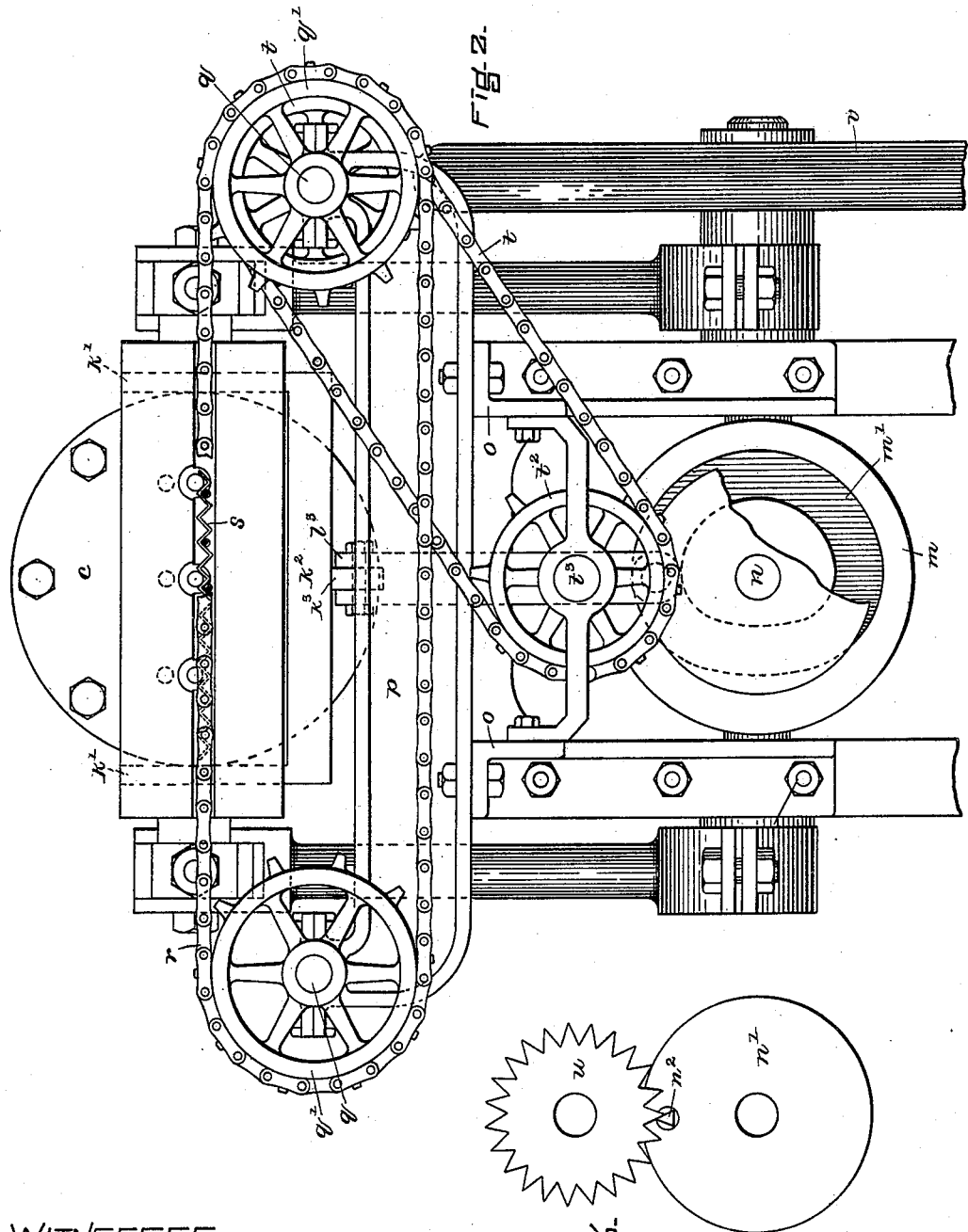
WITNESSES.
INVENTOR –
T. B. Dooley (No Model.) 5 Sheets—Sheet 3.

T. B. DOOLEY.
MACHINE FOR MAKING CARBONS.

No. 583,395. Patented May 25, 1897.

WITNESSES.
C. C. Stecher
M. B. May

INVENTOR-
T. B. Dooley.
By A. W. Crossley,
Atty.

THE NORRIS PETERS CO., PHOTO-LITHO., WASHINGTON, D. C.

(No Model.) 5 Sheets—Sheet 4.
T. B. DOOLEY.
MACHINE FOR MAKING CARBONS.
No. 583,395. Patented May 25, 1897.
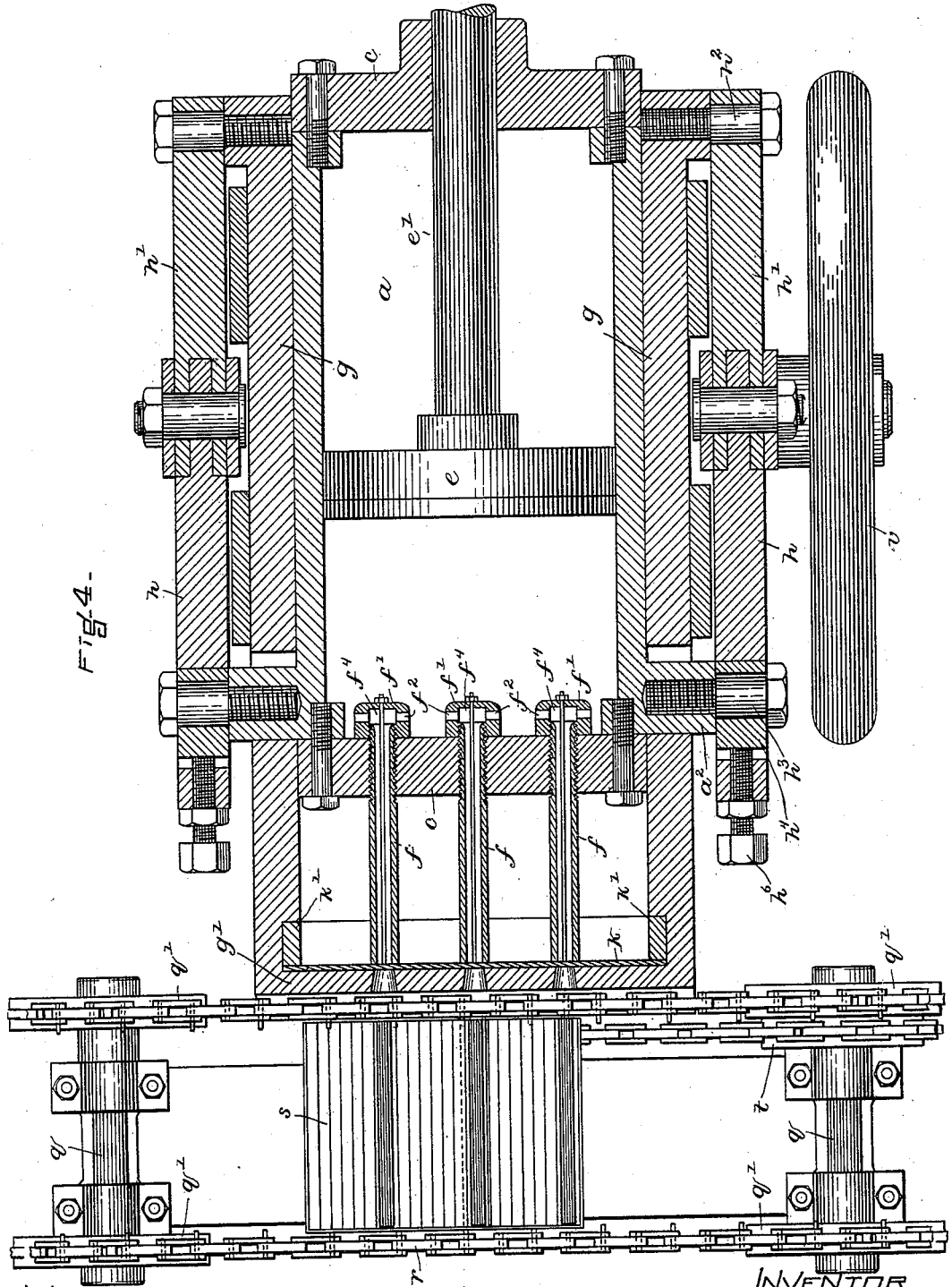
WITNESSES
INVENTOR
T. B. Dooley
By A. W. Crossley
Atty.

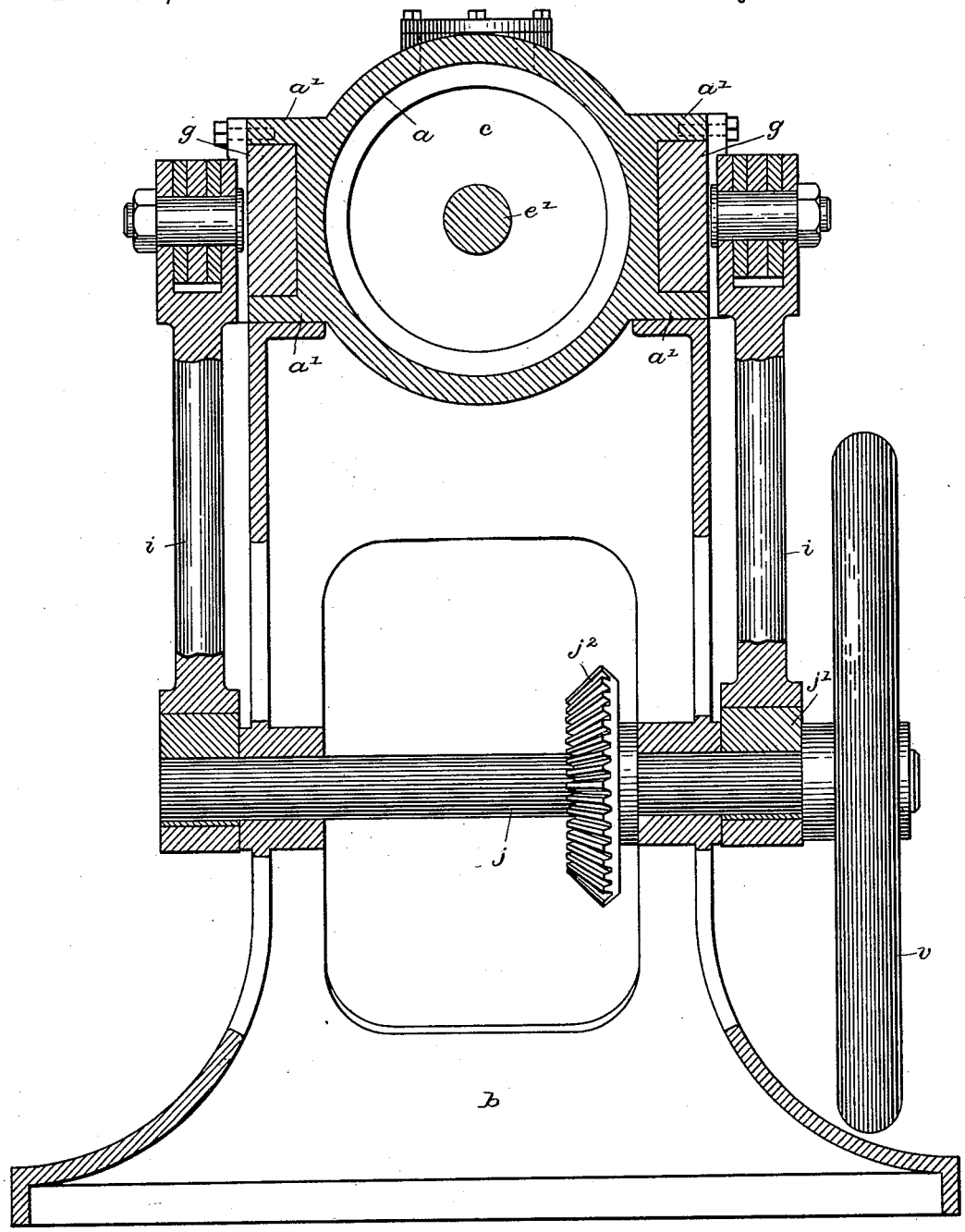

UNITED STATES PATENT OFFICE.

THOMAS BROWN DOOLEY, OF MALDEN, MASSACHUSETTS, ASSIGNOR, BY DIRECT AND MESNE ASSIGNMENTS, TO THE NATIONAL ELECTRIC CARBON AND MANUFACTURING COMPANY, OF BOSTON, MASSACHUSETTS.

MACHINE FOR MAKING CARBONS.

SPECIFICATION forming part of Letters Patent No. 583,395, dated May 25, 1897.

Application filed August 12, 1895. Serial No. 559,029. (No model.)

*To all whom it may concern:*

Be it known that I, THOMAS BROWN DOOLEY, of Malden, in the county of Middlesex and State of Massachusetts, have invented certain new and useful Improvements in Machines for Making Carbons, of which the following is a specification.

This invention has relation to machines for manufacturing carbons for use in various electrical appliances, and has for its object the formation of carbons of great and even density.

The principal objections to the use of machine-made carbons are that they differ in density throughout their lengths, being hard at one point and relatively soft at another, and that they are not as dense as is generally required. Therefore another object of my invention is to provide a machine by which carbons may be formed expeditiously and at the same time of even and great density throughout.

To these ends my invention consists of a machine provided with the various features and coöperating parts which I shall hereinafter describe in detail, and then point out in the claims.

Reference is to be had to the annexed drawings, and to the letters marked thereon, forming a part of this specification, the same letters designating the same parts or features, as the case may be, wherever they occur.

Of the drawings, Figure 1 is a side elevation of one form of machine embodying my invention. Fig. 2 is a rear elevation of the same. Fig. 3 is a vertical central longitudinal sectional view of the same. Fig. 4 is a horizontal sectional view on an enlarged scale. Fig. 5 is a transverse vertical section of the machine. Fig. 6 is a detail of a portion of the power-transmitting devices for removing the finished carbons. Fig. 7 illustrates a compression-tube employed for making solid carbons.

In carrying out my invention I desire to compress the carbons on all sides with an equal pressure until the carbon is of sufficient density throughout, and then deliver it to a carrier whereby it may be removed and dried. I have found that the best results may be obtained by employing the cylinder or hopper $a$, suitably mounted on a frame $b$ and provided with heads $c\ c$. The cylinder is provided with an aperture $d$, through which the material of which the carbon is formed may be delivered therein. This aperture may be closed by a suitable cap or cover $d'$, fastened in place by screws or bolts $d^2$, and provided with a valve $d^3$.

The plunger $e$ is operated by means of a rod $e'$, secured to the end of the piston-rod of a powerfully-acting hydraulic engine (not shown) or other power-generating device.

Through the rear cylinder-head I pass the threaded ends of a series of compression-tubes $f\ f\ f$, each of which is provided with a hollow cap $f'$, screwed upon an inwardly-projecting end thereof, forming an enlarged chamber $f^4$. The caps have a series of six, eight, or more radial apertures $f^2$, through which the material may be forced into the chamber $f^4$ and thence into the hollow compression-tubes $f$.

In parallel guides $a'$ upon the cylinder I mount sliding side bars $g$, having an end bar or abutment $g'$, which has apertures registering with the hollow tubes $f'$. These side bars are arranged to slide back and forth, so as to move the end bar or abutment $g'$ toward and from the compression-tubes, for a purpose to be described. This is accomplished by means of toggle-levers $h\ h'$, arranged on each side of the cylinder, as shown in Fig. 4.

The outer end of each toggle-lever $h'$ is pivoted by means of a threaded bolt $h^2$ to the front end of the side bar $g$, while the opposite end of toggle-lever $h$ is pivoted to a boss $a^2$ on the cylinder by means of a threaded bolt $h^3$, passing through a block $h^4$ in a slot $h^5$ at the end of the lever, this block $h^4$ being adjustable relatively to the lever $h$ by means of an adjusting-screw $h^6$.

$i$ is an eccentric-rod pivoted to the pivot-bolt $i'$ of the toggle-levers and secured at its other end to an eccentric-strap passing around an eccentric $j'$ on the main driving-shaft $j$.

Preferably the eccentric-rod is bifurcated at its upper end, so as to provide two arms passing outside the toggle-levers, as illustrated in Figs. 1 and 5.

It will be seen that as shaft $j$ is rotated the eccentric $j'$ will cause the rod $i$ to rise and fall and move the cross-bar or abutment $g'$ away from and toward the compression-tubes.

In order to close the compression-tubes while the material is being compressed therein, I employ a vertically-sliding plate $k$, which is mounted in bars $k'$, extending up from the cross-bar $k^2$ and provided with apertures $k^6$. The vertical bars $k'$ slide in guides in the side bars $g$, the frame (consisting of the bars $k'$, plate $k$, and cross-bar $k^2$,) being reciprocated vertically by means of a rod $l$, held in guides $l'$ on a bracket on the frame. The rod $l$ has a roller $l^2$ on the end thereof, traveling in a cam-slot $m'$ in a disk $m$ on a horizontal shaft $n$. The said shaft $n$ is provided with a beveled wheel $n'$, meshing with a similar beveled wheel $j^2$ on the main driving-shaft $j$. The rod $l$ is forked at its ends, so as to provide two ears $l^3$ to receive between them an ear $k^3$ on the cross-bar $k^2$. The said ears are all connected together by a pin $k^4$, passing through apertures in the ears $l^3$ and through the horizontal slot $k^5$ in the ear $k^3$, so that when the side bars $g$ are reciprocated the said cross-bar $k^2$ may have a limited movement relatively to the rod $l$.

$o$ $o$ indicate angular brackets extending out from the rear end of the machine, to which is bolted a cross-bracket $p$, upon the end of which are journal-shafts $q$. Upon the ends of the shafts $q$ are secured sprocket-wheels $q'$, which support and drive parallel sprocket-chains $r$, the links of which are provided with inwardly-projecting lugs or attachments adapted to receive and loosely support a corrugated plate or tray $s$.

The chain receives its power from a sprocket-wheel $t$, secured to one of the shafts $q$ and driven by a chain $t'$ from a sprocket-wheel $t^2$, mounted upon the shaft $t^3$, journaled in supports secured to the brackets $o$. Upon the shaft $t^3$ is secured a star-wheel $u$. On the end of the shaft I mount a disk $n'$, which has an outwardly-projecting triangular pin $n^2$, which will impinge upon one of the teeth of the star-wheel $u$ and move it forward, one tooth for each revolution of the disk $n'$. The main driving-shaft $j$ is operated by means of a hand-wheel $v$, which can be rotated to as great an extent as desired by the operative.

I have contemplated connecting the hand-wheel $v$ with the valve of the hydraulic cylinder (not shown) so that the latter may be operated automatically, but I may also operate it manually as well.

The operation of the machine is as follows: Gas-coke, sulfuric acid, treacle, and graphite, in the proportions desired, are placed into the cylinder $a$ through the aperture $d$, (the piston being in front thereof,) and the cap $d'$ is secured in place by bolts $d^2$. The valve of the hydraulic cylinder is moved so as to cause the piston to force the material toward the rear end of the cylinder $a$ and into the compression-tubes $f$. At this time the plate $k$ and the end bar or abutment $g'$ are in the positions shown in Fig. 3—that is to say, the plate $k$ is at its highest possible point and the end bar or abutment $g'$ holds it against the compression-tubes $f$, as shown in Fig. 4. The hydraulic engine forces the piston $e$ forward with as great pressure as may be desired until the carbon material in the compression-tubes $f$ has reached the proper density. Then the wheel $v$ is turned far enough to draw the rod $i$ downward, thereby forcing the side bars $g$ forward. As soon as this is accomplished the parts are so timed that the rod $l$ is forced, by means of the cam and the roller $l^2$, to draw the plate $k$ down far enough so that the apertures $k^6$ in the said plate register with the apertures in the compression-tube and the apertures in the end bar or abutment $g'$. The hydraulic engine is again actuated when the parts are in this position, and the piston $e$ is driven forward until the carbon is forced out of the compression-tubes onto the corrugated tray $s$. The operative then turns the wheel $v$ again sufficiently to cause the plate $k'$ to rise into the position shown in Fig. 3 (cutting off the carbon) and to cause the toggle-levers to draw the abutment $g'$ tightly against the compression-tube $f$, so as to resist the next compression of the carbon. The parts are all so timed that when the wheel $v$ has made one complete revolution the carbon will have been compressed by the piston $e$ in the compression-tubes, the plate $k$ and the end bar $g'$ will have been moved so as to allow a further movement of the piston $e$ to deposit the carbon upon the tray and then move back into place, and the tray will have been moved forward by its chain so that when the carbons are again ejected the next adjacent groove will be ready for them. Thus it will be seen that I provide a plate $k$ to close the ends of the compression-tubes which at the same time operates as a cut-off to cut off the material when a certain amount has been ejected from the tubes, and I also provide an abutment $g'$, which holds the plate $k$ against the tubes and which is of sufficient strength to stand a tremendous pressure. If this end bar or abutment $g'$ were rigid, it would be impossible to slide the plate $k$ up and down to allow for the ejecting of the carbons, and therefore it is provided with means whereby it may be moved horizontally far enough to free the plate $k$ from pressure.

By means of a step-by-step movement which is given to the sprocket-chains $r$ I am enabled to advance the corrugated tray $s$ just far enough so that when the next carbon is ejected the groove will be ready to receive it.

I provide for forming either solid or tubular carbons. In order to form a tubular carbon, I employ a rod or core $w$, threaded into the cap and lying in the axis of the tube, as shown in Fig. 3. In forming the hollow carbons it is necessary to support the rod concentrically of the tube, so that I employ, as before stated, a cap $f'$ with radial apertures which communicate with the chambers $f^4$ in the cap. The apertures are arranged at equal distances around the cap, so that the material is forced into the chamber $f^4$ from all sides with even pressure against the rod, and with the effect of avoiding "blow-holes" or other defects and securing perfect density. The cap, as before stated, serves the further purpose of supporting the rearward end of the rod. I have found in practice that if the rod is supported upon a bar or strip, as is now sometimes done, which bar or strip is arranged in front of the compression-tube, the material when pressed into the tube is cut or severed, as it were, by the rod and is likely to have blow-holes and to be deprived of the same density on a line behind the rod as it has at other points. I have furthermore ascertained from experience that by employing an enlarged chamber in the cap or in front of the tube and by providing means whereby the material can be forced into the chamber laterally, as it were, an even density in the carbon throughout is secured and blow-holes avoided.

In order to produce a solid carbon, the rod is dispensed with. In such cases I prefer to enlarge, as it were, the rearward end of the tube, so as to provide a chamber therein in which the material may be collected before being pressed into the tube, and in this case also I may provide a cap with radial apertures, as in instances mentioned by me wherein I employ a rod or core, though this cap with radial apertures is not in this last-mentioned or modified case necessary. By this construction I have also ascertained that blow-holes are avoided and a carbon of more even density is produced than if no enlargement should be made in the rearward end of the tube.

Having thus explained the nature of the invention and described a way of constructing and using the same, though without attempting to set forth all of the forms in which it may be made or all of the modes of its use, it is declared that what is claimed is—

1. A machine for making carbons, comprising in its construction, a compression-tube, means for forcing material therein through one end thereof and compressing it therein, a movable plate for closing the other end, and a movable abutment for holding the plate against the tube and resisting the pressure of the compressing means, substantially as set forth.

2. A machine for making carbons comprising in its construction, a cylinder or hopper, a compression-tube leading from said cylinder or hopper, a core or rod extending into said tube, and a radially-apertured cap on the inner end of said tube for supporting said rod.

3. A machine for making carbons comprising in its construction, a cylinder or hopper, a reduced open-ended compression-tube leading therefrom, a plunger in said hopper for forcing material into and out from said tube, a cut-off plate for the outer end of said tube, a movable abutment for said plate, and means for actuating said plate and said abutment alternately.

4. A machine for making carbons comprising a compression-tube, means for forcing material therein through one end thereof and compressing it therein, a movable cut-off plate, a movable abutment for said plate, a carrier movable transversely of the compression-tube, and adapted to receive the finished carbons, and means for imparting a step-by-step movement to the carrier.

In testimony whereof I have signed my name to this specification, in the presence of two subscribing witnesses, this 31st day of July, A. D. 1895.

THOMAS BROWN DOOLEY.

Witnesses:
MARCUS B. MAY,
ARTHUR W. CROSSLEY.